US010057956B1

United States Patent
Hidaka

(10) Patent No.: US 10,057,956 B1
(45) Date of Patent: Aug. 21, 2018

(54) LIGHTING CONTROL DEVICE, LIGHTING CONTROL SYSTEM, LIGHTING CONTROL METHOD, AND NON-TRANSITORY COMPUTER-READABLE RECORDING MEDIUM

(71) Applicant: PANASONIC INTELLECTUAL PROPERTY MANAGEMENT CO., LTD., Osaka (JP)

(72) Inventor: Yuto Hidaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/902,709

(22) Filed: Feb. 22, 2018

(30) Foreign Application Priority Data

Feb. 23, 2017 (JP) ................. 2017-032684

(51) Int. Cl.
  *H05B 39/04* (2006.01)
  *H05B 33/08* (2006.01)
  *H05B 37/02* (2006.01)

(52) U.S. Cl.
  CPC ......... *H05B 33/0845* (2013.01); *H05B 37/02* (2013.01)

(58) Field of Classification Search
  CPC ............ H05B 33/0818; H05B 41/2828; H05B 41/3921; H05B 41/3927; H05B 33/0815; H05B 41/28; H05B 37/029; H05B 33/0803; H05B 37/0254; H05B 37/02
  See application file for complete search history.

(56) References Cited

U.S. PATENT DOCUMENTS

| 2012/0184299 | A1 | 7/2012 | Loveland et al. |
| 2014/0306619 | A1 | 10/2014 | Yokosawa et al. |
| 2015/0201480 | A1 | 7/2015 | Ogawa |
| 2015/0332586 | A1* | 11/2015 | Hamm et al. .......... G08C 17/02 |
| 2016/0088716 | A1 | 3/2016 | Loveland et al. |

FOREIGN PATENT DOCUMENTS

| JP | 2012-514829 A | 6/2012 |
| JP | 2012-532404 A | 12/2012 |
| JP | 2014-209411 A | 11/2014 |
| JP | 2015-149710 A | 8/2015 |
| WO | 2010/079388 A1 | 7/2010 |

* cited by examiner

*Primary Examiner* — Minh D A
(74) *Attorney, Agent, or Firm* — McDermott Will & Emery LLP

(57) ABSTRACT

A lighting control device is provided that controls luminaires in respective rooms via respective controllers. The lighting control device includes: a storage unit that stores association information in which names (e.g., room names) are associated with SSIDs of the controllers; a communication unit that connects to and transmits and receives information to and from one of the controllers; a display unit that displays names included in the association information in a manner to be selectable; a receiving unit that receives an input from a user including a selection input of a name selected from the names displayed; and a processing unit that, when the receiving unit receives the selection input of the name, executes a predetermined process relating to wireless connection with one of the controllers using the SSID associated in the association information with the name specified by the selection input.

15 Claims, 13 Drawing Sheets

FIG. 3

ASSOCIATION
INFORMATION       111

| SSID | NAME |
|---|---|
| AAAA12 ··· | ROOM X |
| BBBBB ··· | ROOM Y |
| CC57 ··· | ROOM Z |

FIG. 10

112 AUTHENTICATION RELATED INFORMATION

| AUTHENTICATION INFORMATION | | SSID |
|---|---|---|
| LOGIN ID | PASSWORD | |
| User X | aX9bcZ3 ・・・ | AAAA12 ・・・ |
| User Y | cyBP30u ・・・ | BBBBB ・・・ |
| User Z | kZle90m ・・・ | CC57 ・・・ |

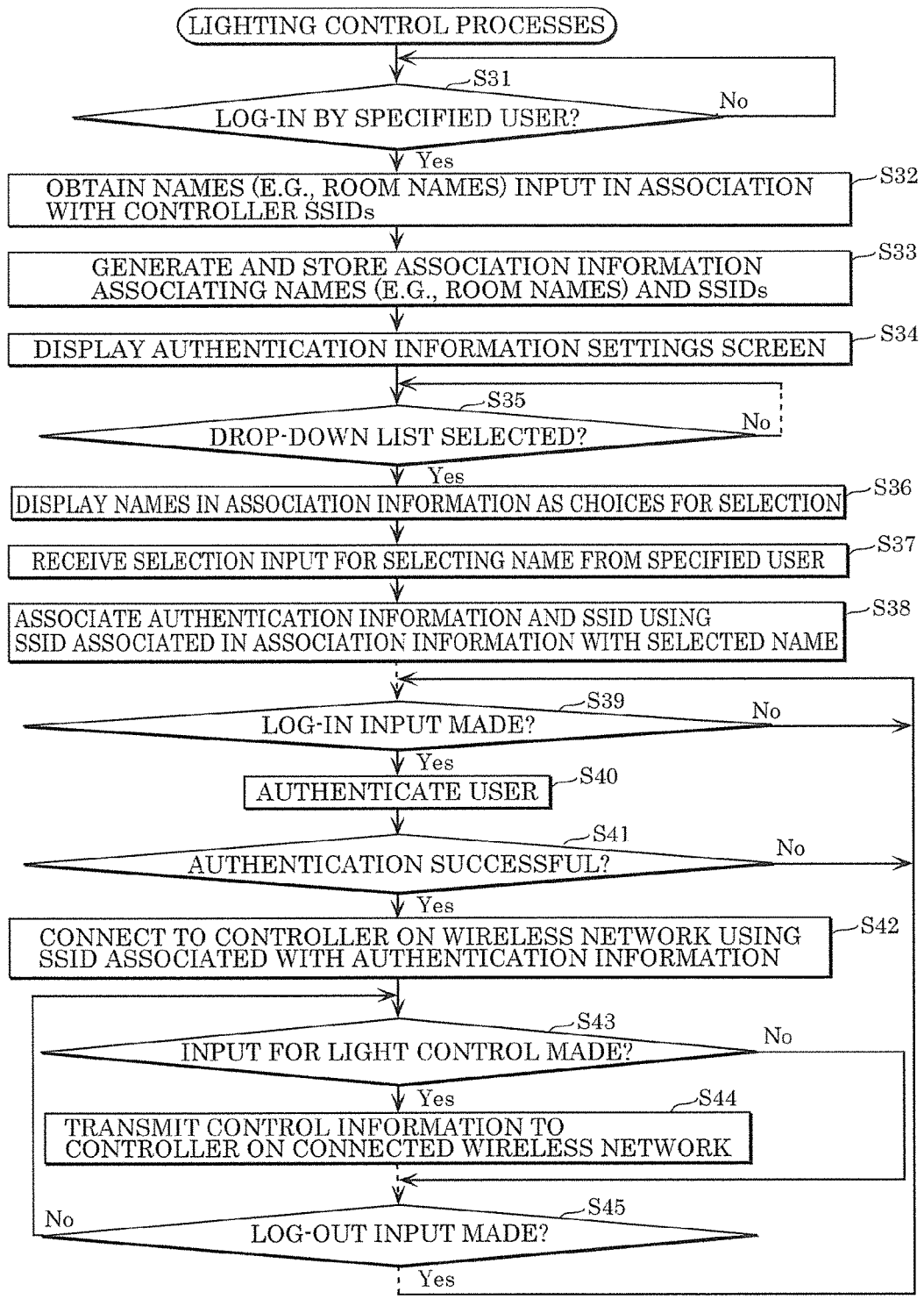

LIGHTING CONTROL DEVICE, LIGHTING CONTROL SYSTEM, LIGHTING CONTROL METHOD, AND NON-TRANSITORY COMPUTER-READABLE RECORDING MEDIUM

CROSS REFERENCE TO RELATED APPLICATION

This application claims the benefit of priority of Japanese Patent Application Number 2017-032684 filed on Feb. 23, 2017, the entire content of which is hereby incorporated by reference.

BACKGROUND

1. Technical Field

The present disclosure relates to a lighting control system for performing control relating to lighting, a lighting control device used in the lighting control system, and a non-transitory computer-readable recording medium.

2. Description of the Related Art

Conventionally, a system that performs control related to, for example, the dimming level (e.g., brightness) of a plurality of luminaires and scheduling for a plurality of luminaires (e.g., timing of turning on and off the luminaires) is known. The lighting management system disclosed in Japanese Unexamined Patent Application Publication (Translation of PCT Application) No. 2012-514829 performs lighting control based on schemata, such as lighting control parameters corresponding to an identified user.

SUMMARY

However, in an environment including a plurality of rooms and controllers in each room that control luminaires in the respective rooms, in a configuration in which the user controls one or more luminaires through wireless communication with a controller in a selected room using a single input terminal (lighting control device), the user is required to perform the following tasks. First, the user is required to select, from among the controllers—each of which functions as an access point of a wireless local area network (LAN)—the service set identifier (SSID) of the controller in the room in which the luminaire to be controlled is located in order to connect to the wireless LAN to enable communication between the input terminal and the controller. Then, the user is required to transmit information, such as lighting control parameters, from the input terminal to the controller by launching, for example, a lighting control application program on the input terminal and making inputs on, for example, the displayed lighting control screen. When the user wants to control luminaires across a plurality of rooms, the user is required to remember the SSID of each controller and repeat the above steps for each room. Moreover, when the user wants to control one or more luminaires in any given room, if the user does not remember the required SSID, the user must repeatedly attempt to select the correct SSID and wait for a response to confirm whether the selected SSID is the correct SSID. In short, the tasks required of the user in order to perform a desired control are burdening. It is not possible to ease such burdens placed on the user with conventional lighting control techniques.

In view of this, the present disclosure has an object to provide an input terminal (lighting control device) that controls luminaires via controllers on a plurality of wireless networks and eases burdens placed on the user associated with controlling the luminaires. The present disclosure also has an object to provide a lighting control system including the lighting control device, and a control program used in the lighting control device.

In order to achieve the above-described object, a lighting control device according to one aspect of the present disclosure controls one or more luminaires via one or more controllers that control the one or more luminaires in accordance with control information, and includes: a storage unit configured to store association information in which a plurality of names are respectively associated with a plurality of network identifiers for a plurality of wireless networks used to transfer the control information; a communication unit that is configured to connect to one of the plurality of wireless networks and transmit and receive information to and from a controller included in the wireless network that the communication unit is connected to; a display unit configured to display the plurality of names in the association information in a manner to be selectable; a receiving unit configured to receive an input from a user including a selection input of one name from among the choices of the plurality of names; and a processing unit configured to, when the receiving unit receives the selection input of one of the plurality of names, execute a predetermined process relating to connection with one of the plurality of wireless networks using the network identifier associated in the association information with the name specified by the selection input.

Moreover, a lighting control system according to one aspect of the present disclosure controls a plurality of luminaires and includes: a first controller that controls a luminaire located in a first location; a second controller that controls a luminaire located in a second location different from the first location; and a lighting control device that transmits control information to one of the first controller and the second controller to control the luminaire via the one of the first controller and the second controller. The lighting control device includes: a communication unit configured to connect to and transmit the control information via one of a first wireless network including the first controller and a second wireless network including the second controller; a storage unit configured to store association information in which a first network identifier for the first wireless network is associated with a first name related to the first location and a second network identifier for the second wireless network is associated with a second name related to the second location; a display unit configured to display the first name and the second name in the association information in a manner to be selectable; a receiving unit configured to receive an input from a user including a selection input of one name from among the choices; and a processing unit configured to, when the receiving unit receives the selection input of the name, execute a predetermined process relating to connection with one of the plurality of wireless networks using the network identifier associated in the association information with the name specified by the selection input.

Moreover, a non-transitory computer-readable recording medium according to one aspect of the present disclosure has a control program recorded thereon for causing a lighting control device to execute a lighting control method. The lighting control device includes a storage unit and a microprocessor and controls a plurality of luminaires via a plurality of controllers that control the plurality of luminaires in accordance with control information. The lighting control process includes: obtaining a first name that is related to a first location and is input by a user in association with a first network identifier for a first wireless network among the plurality of wireless networks that includes a first controller which controls a luminaire located in the first location, and a second name that is related to a second location different from the first location and is input by the user in association with a second network identifier for a second wireless network among the plurality of wireless networks that includes a second controller which controls a luminaire located in the second location; generating association information in which the first network identifier is associated with the first name and the second network identifier is associated with the second name, and storing the association information in the storage unit; displaying the first name and the second name in the association information in a manner to be selectable; receiving an input from the user including a selection input of one name from among the choices; when the selection input of the name is received in the receiving, executing a predetermined process relating to connection with one of the plurality of wireless networks using the network identifier associated in the association information with the name specified by the selection input; and when connected to one of the plurality of wireless networks, transmitting the control information to the controller included in the wireless network connected to.

According to the present disclosure, burdens placed on a user associated with operating a lighting control device that controls luminaires via controllers on a plurality of wireless networks can be eased.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 3 illustrates one example of association information used by a lighting control device;

FIG. 10 illustrates one example of authentication related information used by a lighting control device;

FIG. 13 is a flow chart illustrating one example of processes performed by a lighting control device according to Embodiment 2.

DETAILED DESCRIPTION OF THE EMBODIMENTS

The following describes exemplary embodiments with reference to the drawings. Each of the embodiments described below is merely one specific example of the present disclosure. The numerical values, shapes, materials, elements, arrangement and connection of the elements, steps (processes) and order of the steps, etc., described in the following embodiments are given merely by way of illustration and are not intended to limit the present disclosure. Therefore, among elements in the following embodiments, those not recited in any one of the independent claims defining the broadest inventive concept are described as optional elements. Also note that the figures are schematic illustrations and are not necessarily precise depictions.

Embodiment 1

Hereinafter, lighting control system 10 including a lighting control device according to one embodiment of the present disclosure will be described.

Lighting control system 10 is a system for controlling a plurality of luminaires (e.g., scheduling relating to lighting, adjustment of dimming level, etc.) located in a plurality of spatial locations, examples of which include floors and rooms of a building, such as a commercial building. This embodiment will describe lighting control system 10 that controls luminaires located in a plurality of rooms of a building without greatly burdening the user.

(1-1. Configuration of Lighting Control System 10)

Figure 1:
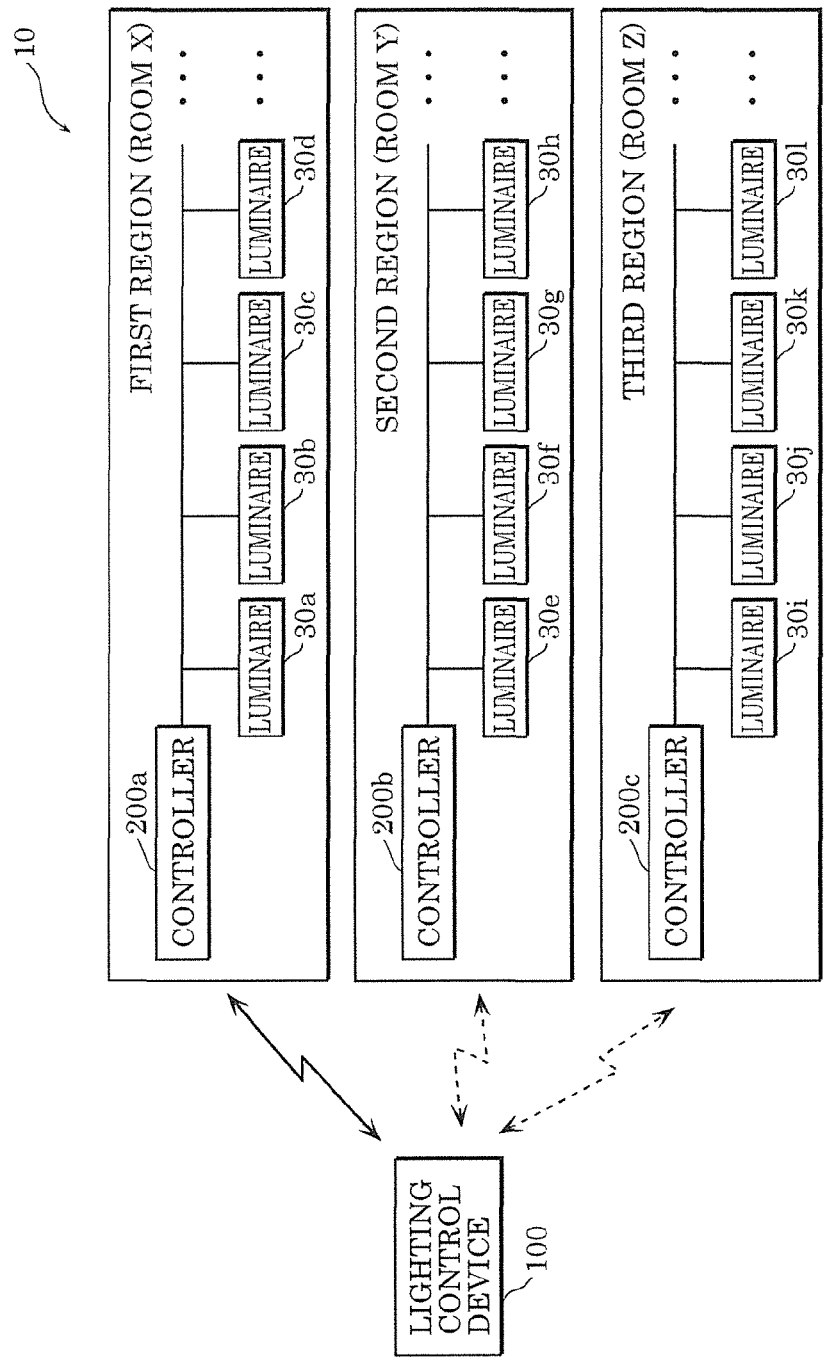
FIG. 1 illustrates an outline of a configuration of a lighting control system according to Embodiment 1.

FIG. 1 illustrates an outline of the configuration of lighting control system 10 according to this embodiment.

As illustrated in FIG. 1, lighting control system 10 includes luminaires 30*a* through 30*l* located in a plurality of rooms (locations), controllers 200*a* through 200*c* each of which is located in different one of the rooms and is for controlling the luminaires located in the corresponding room, and lighting control device 100 that is capable of communicating with each controller. Here, for the purpose of illustration, the number of rooms is exemplified as three (first location, second location, and third location), but the number of rooms including the luminaires is not limited to any given number, and lighting control system 10 may include any number of controllers.

Each luminaire 30*a* through 30*l* is a device that includes a light source and is capable of switching on and off, and, for example, is capable of dimming (e.g., brightness) adjustment.

Each controller 200*a* through 200*c* includes, for example, a control circuit and a communication circuit, and is capable of controlling one or more luminaires. Moreover, each controller 200*a* through 200*c* is on a different wireless network (e.g., a wireless LAN such as a WiFi (registered trademark) LAN). Controllers 200*a* through 200*c* store control information (e.g., various parameters for controlling lighting) upon receiving the control information from lighting control device 100, and control the luminaires in accordance with the control information. The wireless network (wireless LAN) that the controller is included in can be used to, for example, transfer the control information. Here, controllers 200*a* through 200*c* will be described as controllers that function as access points of the wireless LANs.

Each controller 200a through 200c is identified by a service set identifier (SSID) in wireless communication. In the example illustrated in FIG. 1, controller 200a (first controller) is connected (e.g., by wire) to luminaires 30a through 30d located in the first location (room X), is capable of controlling luminaires 30a through 30d, and manages states of luminaires 30a through 30d. Controller 200b (second controller) is connected to luminaires 30e through 30h located in the second location (room Y), is capable of controlling luminaires 30e through 30h, and manages states of luminaires 30e through 30h.

Lighting control device 100 is a device that functions as an input terminal for controlling, via the respective controllers, luminaires controllable by the respective controllers, by communicating with the respective controllers.

(1-2. Lighting Control Device 100 Usage Example)

Next, lighting control performed by lighting control device 100 will be described using an example of when lighting control device 100 controls luminaires in the first location (room X) and the second location (room Y).

The user establishes a wireless connection between lighting control device 100 and controller 200a in order to control luminaires 30a through 30d in the first location (room X). For example, controller 200a transmits, to lighting control device 100, state information indicating states of luminaires 30a through 30d that controller 200a manages (e.g., whether the luminaires are on or off, the dimming levels of the luminaires, etc.). Then, lighting control device 100 displays a lighting control screen that is for receiving an input pertaining to control and that shows the states of luminaires 30a through 30d based on the received state information. Lighting control device 100 transmits control information to controller 200a in accordance with an input made by the user. This allows controller 200a to control luminaires 30a through 30d in accordance with the control information indicating, for example, control regarding, for example, a dimming level, or a control schedule.

Next, the user establishes a wireless connection between lighting control device 100 and controller 200b in order to control luminaires 30e through 30h in the second location (room Y). When, for example, the range in which wireless communication with controller 200b is possible is small, for example, the user can take lighting control device 100 in his or her hand and move into the second location to establish a wireless connection between lighting control device 100 and controller 200b. For example, lighting control device 100 displays a lighting control screen that is for receiving an input pertaining to control and that shows the states of luminaires 30e through 30h based on the state information received from controller 200b, and lighting control device 100 transmits control information to controller 200b in accordance with an input made by the user. This allows controller 200b to control luminaires 30e through 30h in accordance with the control information.

(1-3. Configuration of Lighting Control Device 100)

Lighting control device 100 is, for example, a computer such as a tablet or smart phone, and includes, for example, a processor (microprocessor), memory, communication interface (communication circuit, etc.), and a user interface. Moreover, this computer may include, for example, a hard disk drive. The user interface includes, for example, a display such as a liquid crystal display (LCD), and an input device such as a keyboard or touch panel. The memory is, for example, ROM and/or RAM, and may include, for example, non-volatile memory. The processor performs processes that control, for example, the communication interface and display, by executing a control program, such as an application program stored in the memory. The control program for causing the processor to execute the processes is stored in the memory. By receiving, for example, an input made via the user interface, the computer can, for example, obtain text, voice, or some other kind of information.

Figure 2:
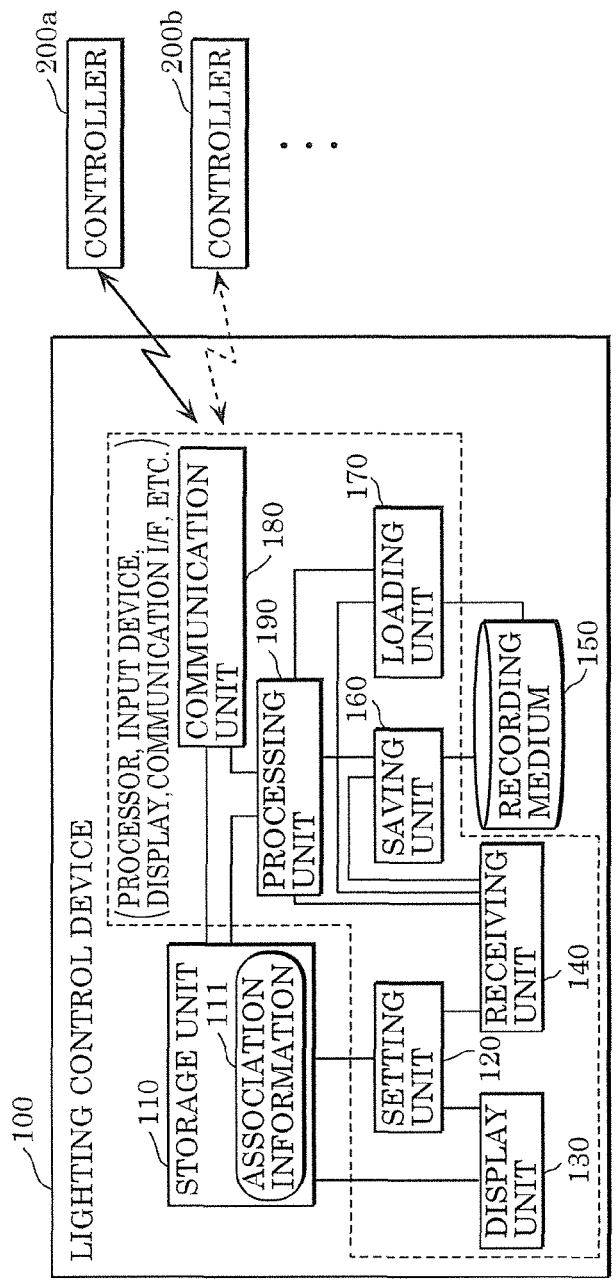
FIG. 2 is a functional block diagram of a lighting control device according to Embodiment 1.

FIG. 2 is a functional block diagram of lighting control device 100. Lighting control device 100 implemented as a computer having the above-described hardware configuration includes, as functional components for controlling lighting, storage unit 110, setting unit 120, display unit 130, receiving unit 140, recording medium 150, saving unit 160, loading unit 170, communication unit 180, and processing unit 190, as illustrated FIG. 2. Hereinafter, each of these functional components will be described.

(1-3-1. Storage Unit 110)

Storage unit 110 is implemented as a storage area of a storage medium, such as memory or a hard disk drive, and stores various information required to control lighting. For example, storage unit 110 stores association information 111 in which a plurality of network identifiers for a plurality of wireless networks are associated with a plurality of names.

FIG. 3 illustrates one example of association information 111 that is stored in storage unit 110. Association information 111 is information in which network identifiers (e.g., SSIDs) and names (e.g., names of rooms assigned by a user) are associated with each other. A network identifier is information used for connecting to a wireless network and avoiding cross talk. In the example illustrated in FIG. 3, SSIDs used for connecting to the controllers functioning as access points are respectively associated with names determined by a user for identifying the rooms including luminaires controlled by the controllers.

(1-3-2. Setting Unit 120)

Setting unit 120 is implemented as, for example, a processor that executes the control program, and generates association information 111 to be stored in storage unit 110 by obtaining names input by the user via receiving unit 140.

As one specific example, the generation of association information 111 exemplified in FIG. 3 will be described. Setting unit 120 obtains a first name that is related to the first location (room X) and is input by the user in association with a first network identifier for a first wireless network among the plurality of wireless networks that includes controller 200a (first controller), which controls luminaires 30a through 30d in the first location. The first network identifier is, for example, the SSID for controller 200a, expressed as "AAAA12 . . . ". The first name is, for example, "room X". Setting unit 120 also obtains a second name that is related to the second location different from the first location and is input by the user in association with a second network identifier for a second wireless network among the plurality of wireless networks that includes controller 200b (second controller), which controls luminaires 30e through 30h in the second location. The second network identifier is, for example, the SSID for controller 200b, expressed as "BBBBB . . . ". The second name is, for example, "room Y". Then, setting unit 120 generates association information 111 by associating at least the first network identifier with the first name and the second network identifier with the second name. In such a case, when obtaining the first name (or second name), setting unit 120 may display the first network identifier (or second network identifier) on the display of display unit 130 and prompt the user to input a name.

After association information 111 has been generated, when setting unit 120 obtains a new name (of a room, etc.)

input by the user via receiving unit 140, setting unit 120 may update association information 111 based on the newly obtained name.

(1-3-3. Display Unit 130)

Display unit 130 is implemented as, for example, a display and a processor that executes the control program and displays various screens on the display. For example, display unit 130 displays a lighting control screen showing the state information (information indicating states of luminaires) received from any one of controllers 200a through 200c by communication unit 180. Display unit 130 may, for example, display screens under control by other units (saving unit 160, loading unit 170, processing unit 190, etc.).

Figure 4:
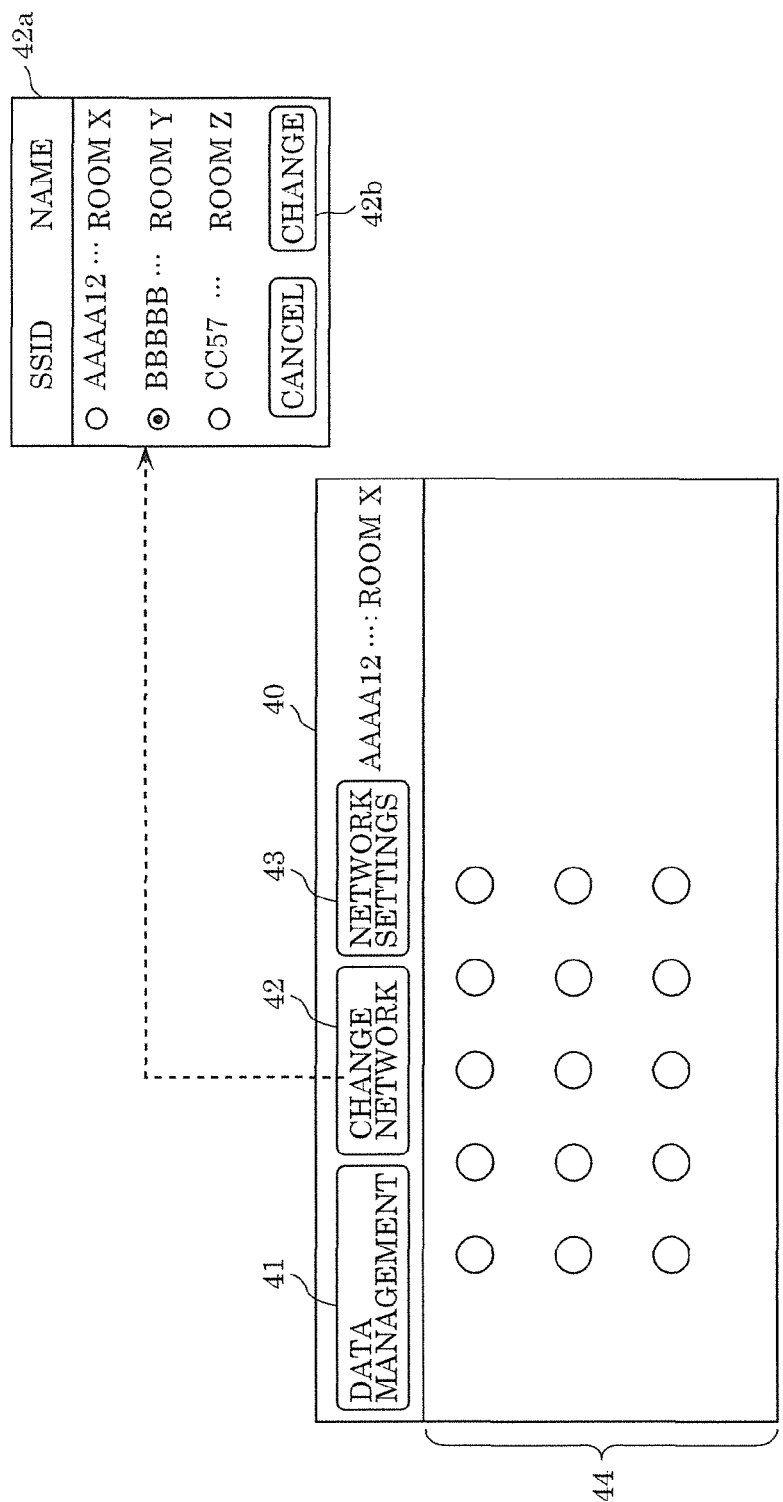
FIG. 4 illustrates one example of a lighting control screen displayed by a lighting control device.

FIG. 4 illustrates one example of a lighting control screen displayed on the display by display unit 130. Lighting control screen 40 illustrated in FIG. 4 includes display region 44 showing, for example, the lighting states and arrangement of luminaires, and includes buttons 41 through 43 as a graphical user interface (GUI). In the example illustrated in FIG. 4, display region 44 shows the states of luminaires 30a through 30d, etc., in room X. The information shown in display region 44 may be configured to be changeable via user input. Button 41 is a button for performing a function of managing data (loading data, saving data, etc.) such as the control information for controlling the luminaire. Button 42 is a button for performing a function of switching the wireless network that lighting control device 100 connects to. Button 43 is a button for performing functions related to various settings associated with the wireless networks that lighting control device 100 connects to.

In addition to lighting control screen 40, a pop-up window (screen 42a) that appears when the user presses button 42 is also illustrated in FIG. 4. Screen 42a shows choices of room names associated with the SSIDs, and includes a cancel button and change button 42b as a GUI. As a result of the user selecting one option among the choices via, for example, a radio button functioning as a GUI on screen 42a and then pressing change button 42b, lighting control device 100 can specify the wireless network to be connected to. The switching of the wireless network is performed by, for example, processing unit 190. The choices to be shown on screen 42a by display unit 130 are based on association information 111 stored in storage unit 110. In this way, when the user is required to select a network identifier (e.g., an SSID) for a wireless network to wirelessly connect to, display unit 130 displays the names (e.g., the names of rooms) included in association information 111 stored in storage unit 110 as choices for selection. The choices may be displayed upon receiving an input from the user, or may be displayed in conjunction with the occurrence of some sort of event (e.g., at a preset point in time). Note that lighting control screen 40 and screen 42a illustrated in FIG. 4 are mere examples; network identifiers may or may not be shown in the display of the choices of names. Moreover, the choices of names (e.g., the names of rooms) included in association information 111 may be shown in lighting control screen 40 at all times so that wireless networks can be switched on the spot.

(1-3-4. Receiving Unit 140)

Receiving unit 140 is implemented as, for example, an input device and a processor that executes the control program, and receives inputs from the user. The input device is, for example, an overlay of a touch panel or keyboard on the display surface. For example, a user input can be made on the input device in accordance with, for example, elements included in the GUI displayed by display unit 130.

Note that receiving unit 140 may receive inputs from the user via any given method. For example, receiving unit 140 may receive user inputs from, for example, touches made on a touch panel, a pointing device, or a keyboard. Moreover, receiving unit 140 may also receive voice inputs with the use of voice recognition technology. The user can input various types of information to control the luminaire. For example, the user can input information indicating the locations of each luminaire in a given room, dimming level information that specifies a dimming level, and schedule information indicating when to turn on or off the luminaires or change the dimming level. For example, the user can input various types of information corresponding to lighting control screen 40 illustrated in FIG. 4. The information for controlling the luminaires in a given location (e.g., room) is converted into control information of a predetermined data format, and temporarily stored in the storage area, such as in memory. Then, in accordance with, for example, a user input, the control information can be transferred to a corresponding controller (any one of controllers 200a through 200c) via communication unit 180.

More specifically, when a plurality of names (e.g., names of rooms) are shown as the choices, such as is the case in screen 42a illustrated in FIG. 4, receiving unit 140 receives an input from the user including a selection input of one name.

When receiving unit 140 receives an input from the user, receiving unit 140 notifies, for example, saving unit 160, loading unit 170, and processing unit 190 with information corresponding to the input (for example, information pertaining to the name selected via a selection input).

(1-3-5. Recording Medium 150)

Recording medium 150 is a medium for recording control information related to control of luminaires, and is, for example, non-volatile memory or a hard disk drive. Recording medium 150 may be the same storage medium that is used in storage unit 110, or may be a different medium. The control information in recording medium 150 can be recorded as the content of the control file via the file system. The control file is a file of a predetermined format in which control information for controlling the lighting is saved in lighting control device 100. In addition to the control information, the control file may also include various types of information relating to lighting, such as information indicating the arrangement of the luminaires and history information in which control executions are recorded.

(1-3-6. Saving Unit 160)

Saving unit 160 is implemented as, for example, a processor that executes the control program. Upon receiving notification that a save input has been made by the user from receiving unit 140, saving unit 160 stores a control file including control information corresponding to the save input into recording medium 150.

When communication unit 180 is already connected to one wireless network, saving unit 160 has a function of, under a certain condition (for example, in accordance with a user input), upon recording the control file onto recording medium 150, associating the control file with the network identifier for the wireless network that communication unit 180 is connected to. Saving unit 160 also has a function of, upon recording the control file onto recording medium 150, associating the control file with any one of the network identifiers in association information 111 (see FIG. 3), in collaboration with processing unit 190.

Next, an example will be given in which lighting control device 100 connects to the wireless network including controller 200a that controls the luminaires in room X and displays lighting control screen 40 illustrated in FIG. 5. In such a case, the user makes inputs pertaining to, for example, the dimming level information and schedule information for controlling the luminaires in room X, and if necessary, makes a save input. Upon making a save input, saving unit 160 records (saves) control information including the dimming level information, schedule information, etc., into recording medium 150 as a control file. One example of a save input involves the user pressing button 41 on lighting control screen 40, and among data load button 45 and data save button 46 shown on data management screen 41a displayed by display unit 130 in accordance with this input, pressing data save button 46. The user can, via screen 46a, which is for specifying a control file and shown by display unit 130 in accordance with the above-described input, specify a file name for the control file and specify a network identifier (e.g., SSID) to be associated with the control file. Then, the user completes the save input by pressing save button 46d on screen 46a, whereby a notification of the save input is received from receiving unit 140, and saving unit 160 saves the control information as a control file. The user can specify a file name for the control file by inputting the file name in input field 46b on screen 46a. By, for example, selecting a radio button provided as a GUI on screen 46a, the user can associate the network identifier for the wireless network that lighting control device 100 (more specifically, communication unit 180) is connected to or some other network identifier with the control file. When the user wants to associate some other network identifier with the control file, the user can interact with drop-down list 46c to display a list of SSID choices associated with names and select the SSID that they wish to associate with the control file.

(1-3-7. Loading Unit 170)

Loading unit 170 is implemented as, for example, a processor that executes the control program. When loading unit 170 is notified of reception of a load input by the user from receiving unit 140, loading unit 170 loads one control file stored (saved) on recording medium 150 in accordance with the load input. Loading the control file is done by, for example, temporarily storing the control information, which is the content of the control file, into a storage area of, for example memory, or updating the elements displayed (for example, the content shown in display region 44) on lighting control screen 40 illustrated in FIG. 4 in accordance with the control information.

Loading unit 170 has a function of displaying, on display unit 130, at least one control file recorded in recording medium 150 as a choice for selection in accordance with the load input made by the user, and when a selection input of one control file is received from the user, loading the control file pertaining to that selection input. When communication unit 180 is already connected to a wireless network, under a certain condition (for example, in accordance with a user input), loading unit 170 causes display unit 130 to narrow down the choices of the one or more control files that are displayed to the one or more control file associated with, for example, the SSID for the connected wireless network.

Next, an example will be given in which lighting control device 100 connects to the wireless network including controller 200a that controls the luminaires in room X and displays lighting control screen 40 illustrated in FIG. 5. One example of a load input involves the user pressing button 41 on lighting control screen 40, and among data load button 45 and data save button 46 shown on data management screen 41a displayed by display unit 130 in accordance with this input, pressing data load button 45. In accordance with the above-described input, for example, screen 45a that is for selecting a control file to be loaded and is displayed by display unit 130 under control by, for example, loading unit 170. Screen 45a is illustrated in FIG. 6. The user can make a selection input of a file name for the control file to be loaded on screen 45a illustrated in FIG. 6. Screen 45a includes, as a GUI, check box 45b, file list 45c which shows a list of the file names of the control files recorded on recording medium 150, a cancel button, and load button 45d. When the user checks check box 45b, the content of file list 45c is narrowed down to only the file names of those recorded control files associated with the SSID representing the network identifier of the wireless network that lighting control device 100 is currently connected to. With this, the user can easily select the control file that he or she wants to load. When the user presses load button 45d on screen 45a, loading unit 170 receives a notification of a load input from receiving unit 140 and loads the selected control file.

(1-3-8. Communication Unit 180)

Communication unit 180 is implemented as, for example, a communication interface and a processor that executes the control program. Communication unit 180 connects to one wireless network from among the plurality of wireless networks and transmits and receives information to and from a controller included in the connected wireless network. In one specific example, communication unit 180 uses any one of the SSIDs in association information 111 (see FIG. 3) to connect to any one of controllers 200a through 200c, and communicates with the connected controller.

For example, communication unit 180 connects to controller 200a using the SSID for controller 200a, and receives state information indicating the states of, for example, luminaires 30a through 30d controlled by controller 200a. Moreover, communication unit 180 transmits control information to controller 200a under a certain condition (for example, in accordance with a user input). Specifically, using, for example, the SSID for controller 200a as an access point, communication unit 180 wirelessly connects to controller 200a by performing a predetermined sequence, such as transmitting a probe request and receiving a probe response, and transmitting an association request and receiving an association response giving permission. Communication unit 180 transmits and receives encrypted information (control information, state information, etc.) to and from controller 200a to which communication unit 180 is wirelessly connected.

Moreover, when a network identifier (for example, an SSID) is associated with a control file loaded by loading unit 170, communication unit 180 connects to a wireless network using that network identifier. Then, communication unit 180 transmits the control information included in that control file to the controller included in the connected wireless network. For example, assume that, via saving unit 160, in accordance with a user input, a control file having the file name "file1_roomX" is recorded in recording medium 150 in association with the SSID for controller 200a. In such a case, when the user selects the control file named "file1 roomX" on screen 45a illustrated in FIG. 6 and presses load button 45d, loading unit 170 loads that control file. When loading the control file, the control information in the control file is transmitted to controller 200a by communication unit 180 wirelessly connecting to controller 200a using the SSID associated with the control file in recording medium 150.

(1-3-9. Processing Unit 190)

Processing unit 190 is implemented as, for example, a processor that executes the control program. When receiving unit 140 receives a selection input selecting one name from among the plurality of names in association information 111, processing unit 190 executes a predetermined process related to connection with a wireless network using the network identifier associated with the name pertaining to the selection input (i.e., associated with the selected name) in association information 111. The predetermined process is a process that uses a network identifier (for example, an SSID).

More specifically, when display unit 130 displays lighting control screen 40 illustrated in FIG. 4 based on state information received from any one of the controllers by communication unit 180, and receiving unit 140 receives a selection input selecting a name (for example, a name appended to an SSID) from the user, as the predetermined process, processing unit 190 switches the wireless network connection using the network identifier (SSID) corresponding to the name pertaining to the selection input made. In this example, communication unit 180 connects to the wireless network (first wireless network) including controller 200a (first controller) using the SSID (first network identifier) for controller 200a. The first network identifier is associated with the first name (for example, room X) of the first location in association information 111. Then, when display unit 130 displays lighting control screen 40 based on the state information received from controller 200a (first controller) by communication unit 180, screen 42a is displayed as, for example, a pop-up display, and receiving unit 140 receives a selection input selecting the second name (e.g., room Y), as the predetermined process, processing unit 190 causes communication unit 180 to switch the connected wireless network from the first wireless network to the second wireless network including controller 200b using the SSID (second network identifier) for controller 200b.

Figure 7:
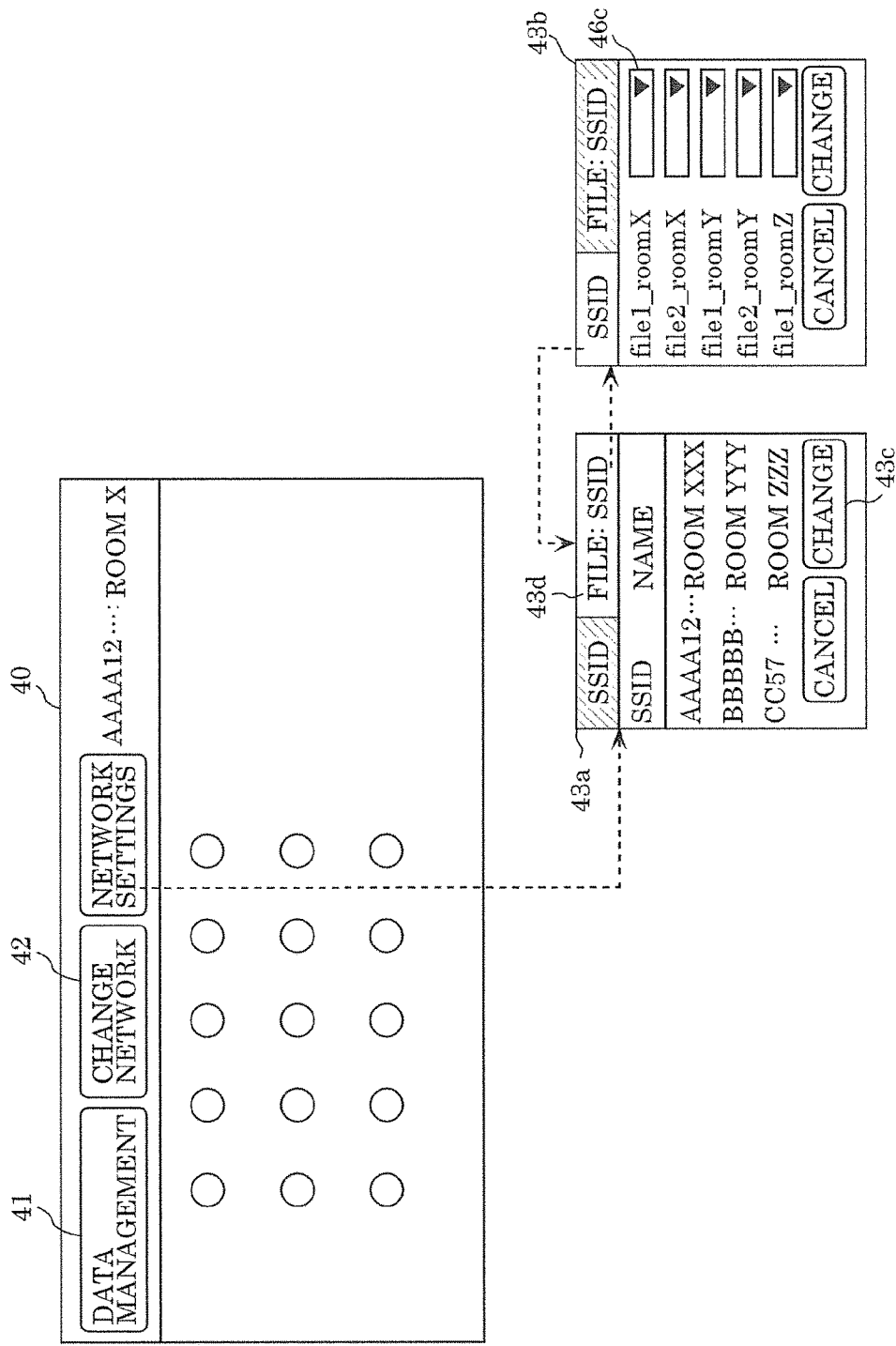
FIG. 7 illustrates one example of a screen pertaining to network settings displayed by a lighting control device.

Moreover, processing unit 190 may, as the predetermined process, associate a control file recorded in recording medium 150 with a network identifier (e.g., an SSID) associated, in association information 111, with a name pertaining to a selection input received by receiving unit 140. For example, when saving unit 160 attempts to record (save) a control file in accordance with a save input made by the user, processing unit 190 receives the file name of the control file and a notification of a name pertaining to a selection input made by the user from receiving unit 140. Then, processing unit 190 specifies the network identifier (SSID) to be associated from the name based on association information 111, and causes saving unit 160 to record the control file and the network identifier in association with each other onto recording medium 150. At times other than saving the control file as well, processing unit 190 may associate the SSID with a control file recorded on recording medium 150 in accordance with a user input. FIG. 7 illustrates, for example, screen 43a pertaining to network settings displayed by display unit 130 when button 43 on lighting control screen 40 illustrated in FIG. 4 is pressed. SSIDs and names are shown on screen 43a, which is displayed when button 43 is pressed, based on the content of association information 111 generated by setting unit 120 and stored in storage unit 110. When change button 43c on screen 43a is pressed, a screen for changing names is displayed, and the user can input a name or names on the screen. Moreover, screen 43a switches to screen 43b when the user selects tab 43d on screen 43a On screen 43b, by interacting with the same drop-down list 46c illustrated in FIG. 5, the user can display a list of choices of the SSIDs associated with the names, and can select an SSID (name) to be associated with each control file. Processing unit 190 specifies the SSID to be associated with a control file in accordance with the selection input, and associates the control file with the SSID in recording medium 150.

(1-4. Operations Performed by Lighting Control System 10)

Hereinafter, operations performed by lighting control system 10 having the above-described configuration will be described with focus on lighting control device 100.

Figure 8:
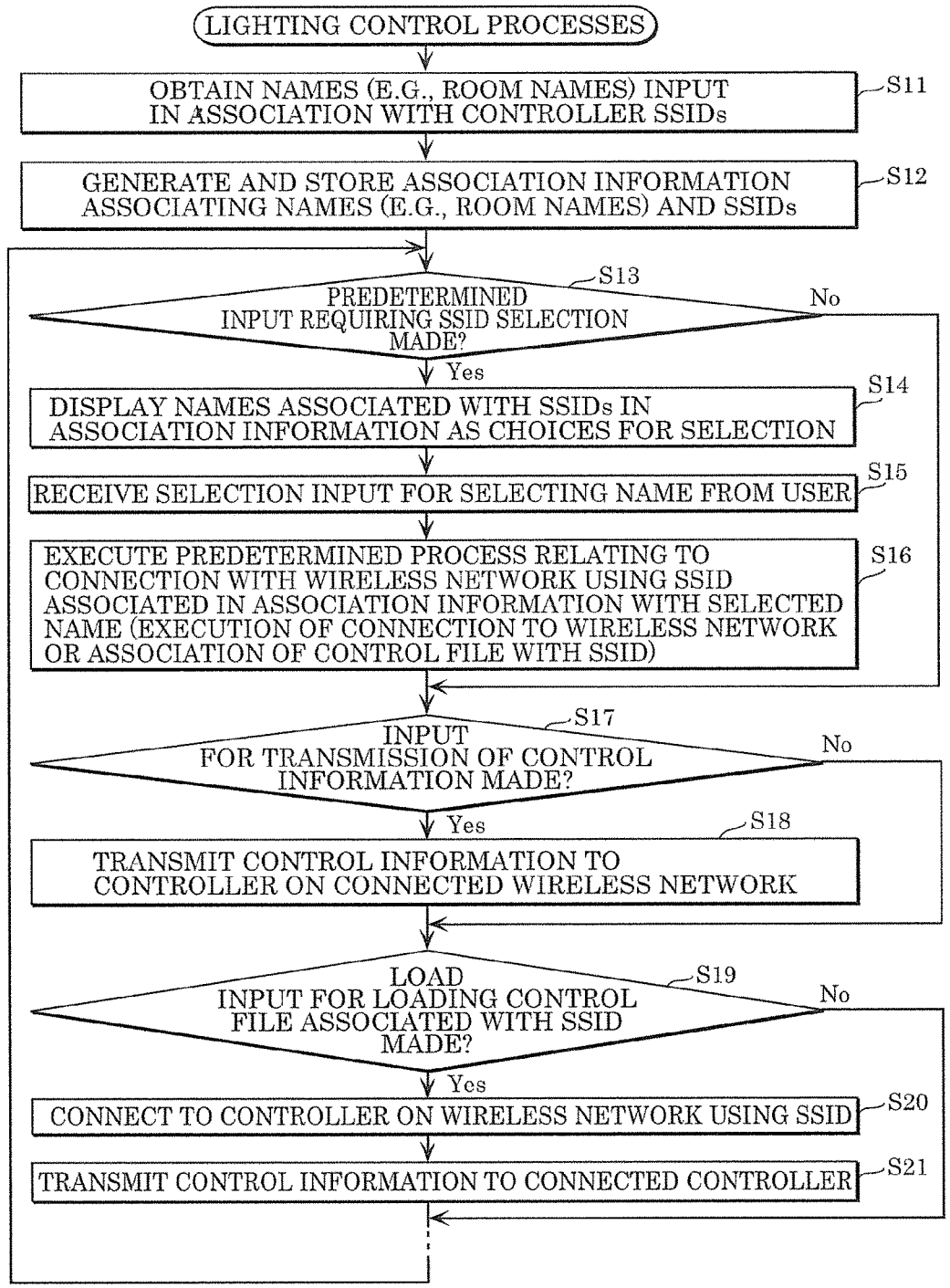
FIG. 8 is a flow chart illustrating one example of processes performed by a lighting control device according to Embodiment 1.

FIG. 8 is a flow chart illustrating one example of lighting control processes performed by lighting control device 100 according to this embodiment. These lighting control processes constitute an example of one specific method of lighting control performed in lighting control system 10. The following specific example will be described based on this flow chart.

In response to receipt of a user input by receiving unit 140, lighting control device 100 obtains names (e.g., room names) input in association with the SSIDs of the controllers on each of the wireless networks (step S11). For example, lighting control device 100 obtains a first name (e.g., "room X") input by the user in association with the SSID (first network identifier) for a first wireless network including controller 200a (first controller) which controls luminaires located in the first location (room X). Lighting control device 100 also obtains a second name (e.g., "room Y") input by the user in association with the SSID (second network identifier) for a second wireless network including controller 200b (second controller) which controls luminaires located in the second location (room Y).

Next, lighting control device 100 generates and stores association information 111 in which the respective SSIDs and names (e.g., room names) are associated with each other (step S12). In other words, lighting control device 100 generates association information 111 in which the first network identifier is associated with the first name and the second network identifier is associated with the second name, and causes storage unit 110 to store association information 111. Note that association information 111 may include, for example, information associating other network identifiers (e.g., the SSID for controller 200c) with names (e.g., room Z). Association information 111 generated as described above is used to display names as choices for selection in the case that an SSID is selected. Giving the network identifiers (e.g., SSIDs) names (e.g., room names) enables the user to switch the wireless network that lighting control device 100 is connected to simply by selecting a name, eliminating the need for the user to remember the network identifiers.

Lighting control device 100 performs steps S14 through S16 when a predetermined input is made that requires the selection of an SSID (step S13). A predetermined input is, for example, operation of button 42 illustrated in FIG. 4 for changing the connected network, operation of drop-down list 46c on screen 46a illustrated in FIG. 5 for specifying a control file for the data to be saved to, etc. When a predetermined input is received, in step S14, lighting control device 100 displays the names associated with the SSIDs in association information 111 as choices for selection, and in step S15, receives a selection input made by the user selecting one of the choices of the names. Next, in step S16, lighting control device 100 executes a predetermined process corresponding to the predetermined input using the SSID associated in association information 111 with the name pertaining to the selection input (i.e., the selected name). In other words, if the predetermined input is operation of button 42 for changing the connected network, in step S16, lighting control device 100 connects to a wireless network using that SSID. If the predetermined input is operation of drop-down list 46c on screen 46a for specifying a control file, in step S16, lighting control device 100 records that SSID onto recording medium 150 in association with the control file.

When lighting control device 100 receives a predetermined user input for transmitting control information (step S17), lighting control device 100 transmits control information for performing luminaire control to the controller on the connected wireless network (any one of controllers controller 200a through 200c) (step S18). This makes it possible for the luminaires to be controlled by that controller.

Moreover, when lighting control device 100 receives, from the user, a load input for loading a control file associated with the SSID (step S19), lighting control device 100 connects to a controller using that SSID (step S20), and transmits control information to the controller (step S21).

Lighting control device 100 can repeatedly execute processes, including steps S13 through S21. With the above-described lighting control processes, it is possible to reduce the burden placed on the user when controlling luminaires located in locations (e.g., rooms) via controllers on a plurality of wireless networks. Note that the lighting control processes illustrated in FIG. 8 are mere examples; lighting control device 100 may also perform processes other than those shown in each step in FIG. 8.

Embodiment 2

Hereinafter, an embodiment in which part of lighting control device 100 in lighting control system 10 exemplified in Embodiment 1 has been changed will be described.

(2-1. Variation of Lighting Control System 10 and Usage Example)

Lighting control device 100 according to Embodiment 1 may or may not perform user authentication. In contrast, the lighting control device according to this embodiment performs user authentication, and can execute a function for controlling luminaires only after the user authentication is successful. Except for the inclusion of lighting control device 100a, which is a variation of lighting control device 100, the lighting control system according to this embodiment is the same as lighting control system 10 illustrated in FIG. 1 and as such, the same reference signs as in FIG. 1 are used.

In this embodiment, the first location (room X), second location (room Y), and third location (room Z) illustrated in FIG. 1 will be exemplified as locations in a single commercial building, each of which is occupied by a different tenant (office, store, etc.). A user who is, for example, the manager of the commercial building (hereinafter also referred to as a specified user) and users each of whom is, for example, an employee of a tenant, all use the same lighting control device 100a at mutually different times. Lighting control device 100a performs user authentication to, for example, prevent a user who belongs to one tenant from controlling luminaires in a location corresponding to another tenant.

The specified user, who is, for example, the manager of the commercial building, has predetermined authorization to setup authentication information for authenticating users on a user by user basis. Lighting control device 100a may authenticate the specified user having predetermined authorization using any given method. The specified user sets (e.g., inputs) the authentication information (e.g., login ID and password) for each user using lighting control device 100a, and can cause lighting control device 100a to store the authentication information. Moreover, the authentication information is associated with network identifiers for wireless networks that an authenticated user has access to (e.g., SSIDs for controllers included in the wireless networks) via an input made by the specified user on lighting control device 100a.

(2-2. Configuration of Lighting Control Device 100a)

Lighting control device 100a has the same hardware configuration as lighting control device 100, but partially differs from lighting control device 100 in regard to function.

Figure 9:
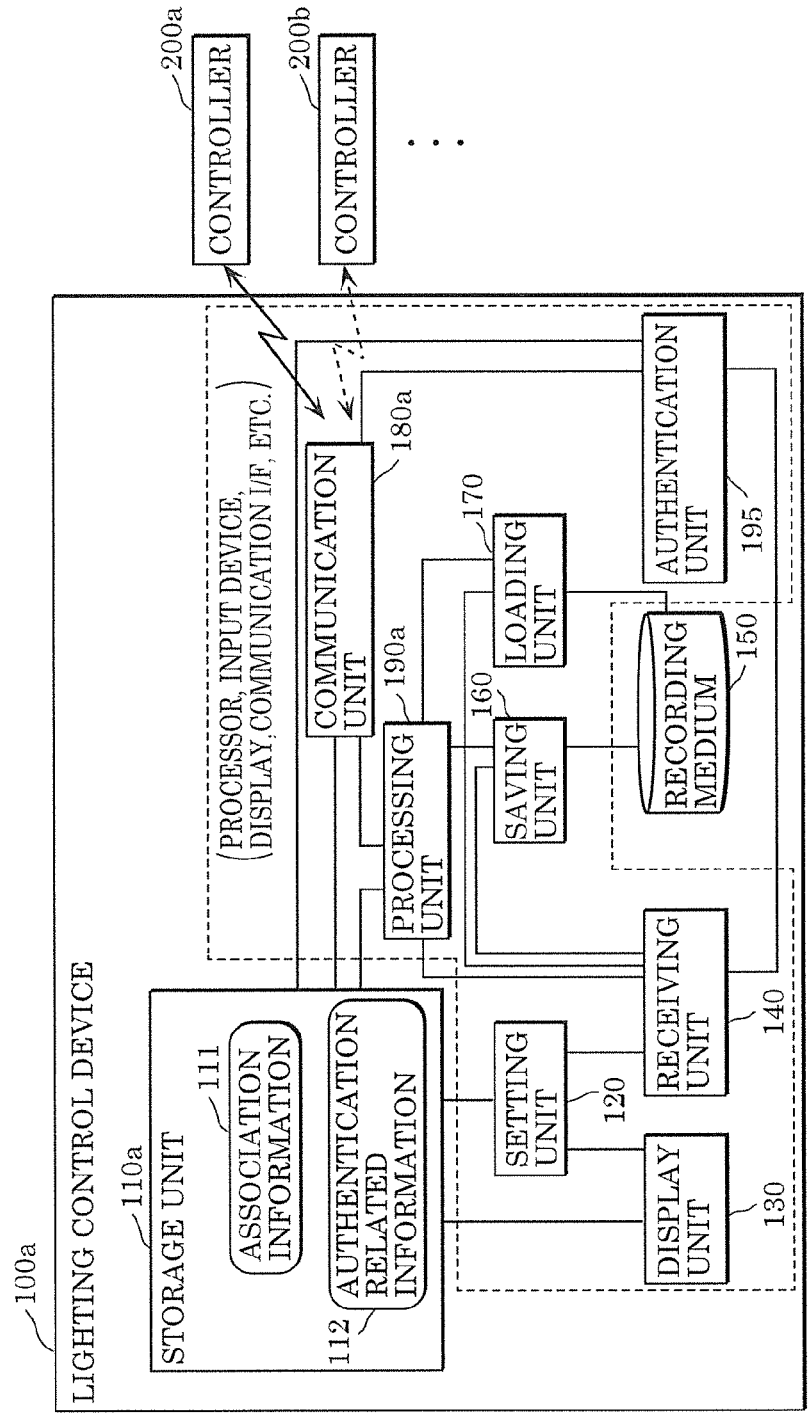
FIG. 9 is a functional block diagram of a lighting control device according to Embodiment 2.

FIG. 9 is a functional block diagram of lighting control device 100a. As illustrated in FIG. 9, lighting control device 100a includes storage unit 110a, setting unit 120, display unit 130, receiving unit 140, recording medium 150, saving unit 160, loading unit 170, communication unit 180a, processing unit 190a, and authentication unit 195. In lighting control device 100a, elements that are the same as in lighting control device 100 according to Embodiment 1 and illustrated in FIG. 2 are given the same reference signs as in FIG. 2. Here, configurations of lighting control device 100a that are not described in particular are the same as lighting control device 100.

(2-2-1. Storage Unit 110a)

Storage unit 110a is implemented as a storage area of a storage medium, such as memory or a hard disk drive, and stores various information required to control lighting, just like storage unit 110 described in Embodiment 1. For example, storage unit 110a stores association information 111 and authentication related information 112.

FIG. 10 illustrates one example of authentication related information 112 that is stored in storage unit 110a. Authentication related information 112 is information in which authentication information (login ID and password) for each user is associated with network identifiers (SSIDs). Authentication related information 112 is generated and stored when the authentication information is setup by the specified user. In the example illustrated in FIG. 10, for example, the login ID (user x) for a user who is, for example, an employee of the tenant of the first location (room X) illustrated in FIG. 1 is associated with the SSID for controller 200a. Moreover, for example, the login ID (user Y) for a user who is, for example, an employee of the tenant of the second location (room Y) is associated with the SSID for controller 200b. In other words, authentication related information 112 is information in which authentication information for each user is associated with any one of the network identifiers (SSIDs) included in association information 111 (see FIG. 3). Accordingly, the specified user is a user having authorization (predetermined authorization) to store authentication related information 112 in lighting control device 100a.

(2-2-2. Authentication Unit 195)

Authentication unit 195 is implemented as, for example, a processor that executes the control program. Authentication unit 195 authenticates users using authentication information in authentication related information 112 stored in storage unit 110a.

Figure 11:
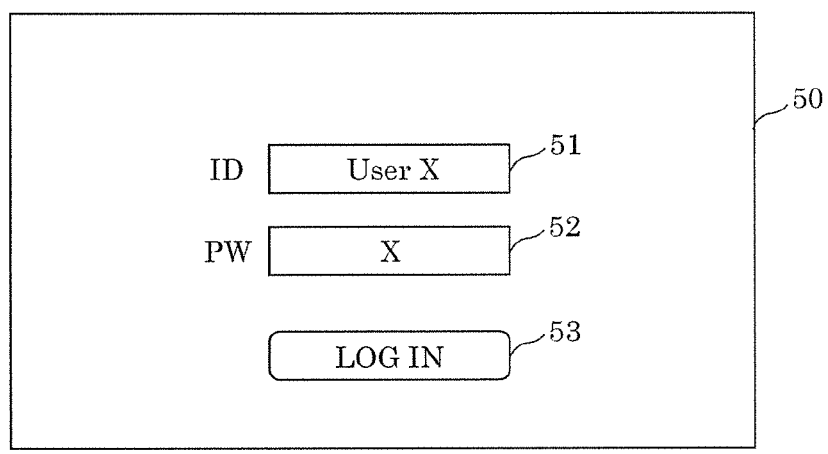
FIG. 11 illustrates one example of a user authentication screen displayed by a lighting control device.

FIG. 11 illustrates one example of a user authentication screen displayed by display unit 130 in lighting control device 100. User authentication screen 50 illustrated in FIG. 11 includes input fields 51 and 52 and login button 53 as GUIs. Input field 51 is a field for receiving an input of a user's login ID, and input field 52 is a field for receiving an input of a user's password. For example, when login button 53 is pressed, receiving unit 140 notifies authentication unit 195 of the login ID and password entered in input fields 51 and 52.

Lighting control device 100a first displays the user authentication screen on display unit 130, obtains, from authentication unit 195, the login ID and password entered by the user via receiving unit 140, and authenticates the user by referencing the authentication information included in authentication related information 112. Lighting control device 100*a* receives user inputs pertaining to lighting control only after the authentication is successful (after the information obtained from the user matches authentication information in authentication related information 112).

(2-2-3. Communication Unit 180*a*)

Communication unit 180*a* is implemented as, for example, a communication interface and a processor that executes the control program, and connects to one wireless network from among the plurality of wireless networks and transmits and receives information to and from a controller included in the connected wireless network, just like communication unit 180 described in Embodiment 1.

When user authentication is successful in authentication unit 195, communication unit 180*a* connects to a wireless network using the network identifier (SSID) associated with the authentication information in authentication related information 112 used for the successful user authentication. For example, when user authentication is successful in authentication unit 195 as a result of receiving an input of a login ID, etc., of user x from a user who is, for example, an employee of the tenant of room X, communication unit 180*a* wirelessly connects to a wireless network using the SSID of controller 200*a*. With this, the user is not required to separately specify the wireless network to which lighting control device 100*a* is to connect to. In other words, the user can cause lighting control device 100*a* to connect to the wireless network of the controller that controls the lighting in the location corresponding to that user, simply by inputting authentication information such as a login ID. When user authentication is successful in authentication unit 195 as a result of receiving an input of a login ID, etc., of user x from a user who is, for example, an employee of the tenant of room X, under a certain condition (for example, in accordance with a user input), communication unit 180*a* transmits control information to controller 200*a*.

(2-2-4. Processing Unit 190*a*)

Processing unit 190*a* is implemented as, for example, a processor that executes the control program, just like processing unit 190 according to Embodiment 1. When receiving unit 140 receives a selection input selecting one name from among the plurality of names in association information 111, processing unit 190*a* executes a predetermined process related to connection with a wireless network using the network identifier associated with the selected name in association information 111.

Figure 12:
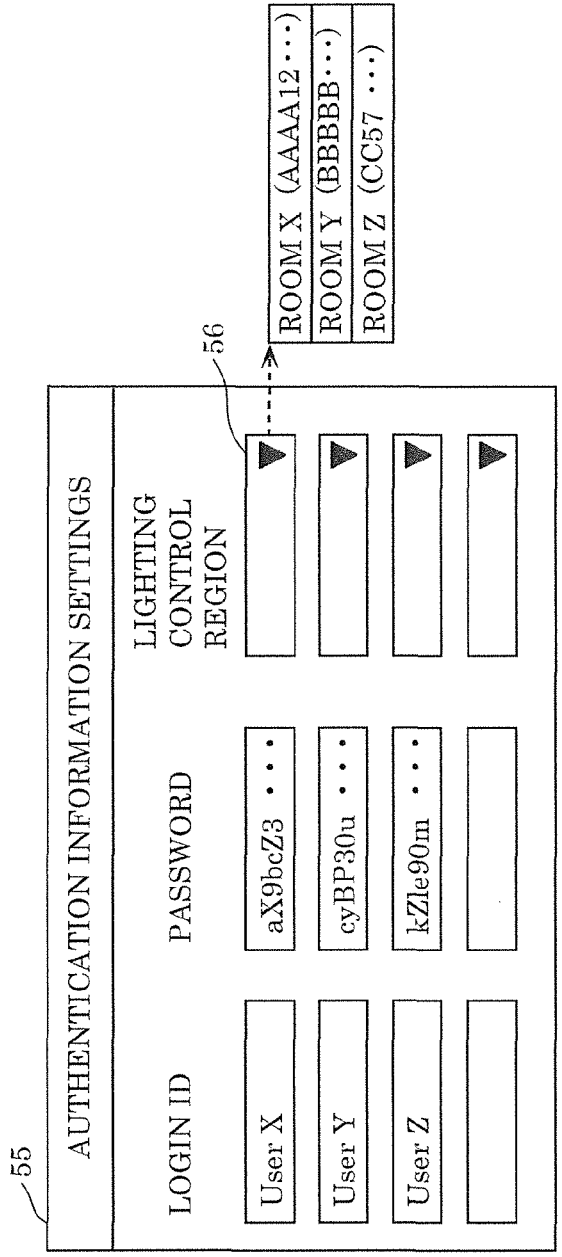
FIG. 12 illustrates one example of an authentication information settings screen displayed by a lighting control device.

Lighting control device 100*a* has a function of displaying, via display unit 130, a screen (authentication information settings screen) for setting authentication information to be used by the specified user to authenticate each user, and an authentication information setting function including receiving, via receiving unit 140, an input from the specified user for setting the authentication information. One example of an authentication information settings screen displayed via this authentication information setting function is illustrated in FIG. 12. Authentication information settings screen 55 illustrated in FIG. 12 includes input fields for authentication information, exemplified here as login IDs and passwords, and drop-down list 56. When drop-down list 56 is selected, choices of names (e.g., room names) included in association information 111 are displayed.

After processing unit 190*a* receives a selection input of a name from the specified user via receiving unit 140, as the predetermined process, processing unit 190*a* associates authentication information with the SSID associated in association information 111 with the name pertaining to the selection input received via receiving unit 140, and stores this as content of authentication related information 112 in storage unit 110*a*. For example, after authentication related information 112 is already stored in storage unit 110*a*, lighting control device 100*a* may display the authentication information settings screen in accordance with an input made by the specified user and update the stored authentication related information 112 when an input is received.

(2-3. Operations Performed by Lighting Control Device 100*a*)

FIG. 13 is a flow chart illustrating one example of lighting control processes performed by lighting control device 100*a* according to this embodiment. Hereinafter, operations performed by lighting control device 100*a* will be described based on FIG. 13. Here, an example will be given in which the specified user uses lighting control device 100*a* to set the names (e.g., room names) for the SSIDs for controllers 200*a* through 200*c* in the locations illustrated in FIG. 1 and set authentication information (login ID and password) for each user. For example, the specified user is a manager of the commercial building including locations occupied by a plurality of tenants, and the other users are employees of the tenants.

When a specified user having predetermined authorization makes a log-in input, lighting control device 100*a* performs authentication on the specified user using a predetermined method (step S31).

When the authentication of the specified user is successful, in response to receipt of an input by the specified user via receiving unit 140, lighting control device 100*a* obtains names (e.g., room names) input in association with the SSIDs of the controllers on each of the wireless networks (step S32). Next, lighting control device 100*a* generates and stores association information 111 in which the SSIDs and names (e.g., room names) are respectively associated with each other (step S33). Steps S32 and S33 are the same as steps S11 and S12 described in Embodiment 1.

Next, lighting control device 100*a* displays authentication information settings screen 55 using display unit 130 (step S34). The specified user, who is, for example, the manager of the commercial building, inputs authentication information for each user, each of whom is, for example, an employee of a tenant, on authentication information settings screen 55. When the specified user makes an input (selection) on drop-down list 56 (step S35), lighting control device 100*a* displays choices of names (e.g., room names) included in association information 111, as illustrated in FIG. 12 (step S36). Next, lighting control device 100*a* receives a selection input selection one of the choices of names by the specified user via receiving unit 140 (step S37). Lighting control device 100*a* then stores the authentication information input by the specified user in association with a SSID using the SSID associated in association information 111 with the selected name (step S38). Although partially omitted in FIG. 13, the specified user can input authentication information for a plurality of users and select names from drop-down list 56. As a result, authentication related information 112 such as the example illustrated in FIG. 10 is stored in storage unit 110*a*.

The processes in step S39 and subsequent steps described below are executed in a state in which the above settings have been made by the specified user and association information 111 and authentication related information 112 are stored in storage unit 110*a*.

When lighting control device 100*a* receives a log-in input made by a user (step S39), authentication unit 195 performs user authentication using the authentication information in authentication related information 112 (step S40). If the user authentication fails, lighting control device 100a returns to a log-in input stand-by state (step S39).

When the user authentication is successful in step S40 (step S41), lighting control device 100a connects to a wireless network (controller) using the SSID associated in authentication related information 112 with the authentication information used in the successful user authentication (step S42). With this, for example, when an input of a login ID of "user x" is received from a user who is an employee of the tenant occupying room X in FIG. 1 and the user authentication is successful, communication unit 180a connects to controller 200a enters a state in which communication is possible.

When lighting control device 100a receives a predetermined user input for transmitting control information (step S43), lighting control device 100a transmits control information for controlling luminaires to the controller on the connected wireless network (e.g., controller 200a) (step S44). This makes it possible for, for example, luminaires 30a through 30d in room X to be controlled by controller 200a. Although omitted in the example illustrated in FIG. 13, note that lighting control device 100a can receive, for example, state information from controller 200a and display, for example, lighting control screen 40 (see FIG. 4). Lighting control device 100a may prohibit connection to a wireless network (i.e., changing connection to another wireless network) using an SSID other than the SSID associated with authentication information pertaining to the authenticated user in authentication related information 112. Moreover, lighting control device 100a may change connection to another wireless network under a certain condition, for example.

Moreover, when a log-out input is received from a user, lighting control device 100a returns to a log-in input stand-by state (step S39).

With such lighting control processes, simply by a user making a login-in input, lighting control device 100a can connect to a wireless network for controlling the luminaires allowed to be controlled by that user, thereby making it possible to reduce the burden placed on the user. Note that the lighting control processes illustrated in FIG. 13 are mere examples; lighting control device 100a may also perform processes other than those shown in each step in FIG. 13.

Other Embodiments, Etc.

Hereinbefore, lighting control system 10, etc., have been described based on Embodiments 1 and 2, but these embodiments are mere examples; it goes without saying that various changes, additions, and omissions may be made.

In the above embodiments, lighting control system 10 is exemplified as being implemented in a commercial building, but lighting control system 10 may be implemented in some other kind of building (such as a house, station building, stadium, or hall). Moreover, the spatial locations in which the luminaires are located, such as the first location and the second location illustrated in FIG. 1, need not necessarily be separated by floors or rooms; a plurality of spatial locations may exist in a single room.

Moreover, in Embodiment 2 described above, an example is given in which the specified user sets up authentication information for user authentication for each user belonging to a different tenant, but "tenant" is merely one example. For example, the authentication information for each user may simply be associated with the network identifier, e.g., the SSID of one controller. Moreover, a single user may have a plurality of login IDs, for example, and in authentication related information 112, and each unit of authentication information for the login IDs, for example, for a single user may be associated with a different network identifier.

Moreover, in the above embodiments, controller 200a, for example, is exemplified as functioning as an access point on a wireless network (wireless LAN). However, controller 200a, for example, merely need be a device included in a wireless network, and need not have a wireless communication function itself. Here, a device included in a wireless network is a device that is an access point on a wireless network or a device connected by wire to such a device.

Moreover, in the above embodiments, the network identifier is exemplified as an SSID, but the network identifier may be any information used to identify and connect to a wireless network. For example, the network identifier may be an extended service set identifier (ESSID) or a basic service set identifier (BSSID).

Moreover, the functional duty of each element (for example, setting unit 120, display unit 130, receiving unit 140, saving unit 160, loading unit 170, processing unit 190, 190a, communication unit 180, 180a, authentication unit 195, etc.) included in lighting control device 100, 100a described in the above embodiments is not limited to the above examples; the duties may be changed discretionarily. Moreover, lighting control device 100, 100a may have a function of communicating with an external server device via a wide-area network such as the internet, and some functions of lighting control device 100, 100a may be assigned to that external server device.

Moreover, the order in which the processes are executed by the above-described lighting control system 10 (e.g., the order of the processes illustrated in FIG. 8 and FIG. 13) are not necessarily limited to the orders described above. So long as it does not depart from the scope of the present disclosure, the order of in which the processes are executed may be rearranged and some processes may be, for example, omitted. Moreover, some or all of the processes (the processes illustrated in FIG. 8 and FIG. 13, for example) may be implemented via hardware, and alternatively may be implemented using software. In other words, some or all of the functions of a component (for example, setting unit 120, display unit 130, receiving unit 140, saving unit 160, loading unit 170, processing unit 190, 190a, communication unit 180, 180a, authentication unit 195, etc.) capable of implementing at least one function of a processor (for example, an integrated circuit capable of executing a program) included in the above-described lighting control device 100, 100a may be implemented using, for example, an integrated circuit without the use of software (i.e., without executing a program). Moreover, the control program that executes the processor or processors in lighting control device 100, 100a may be recorded on a recording medium, and distributed or circulated, etc. For example, by installing the distributed control program onto a computer and executing the control program via a processor, the computer can execute all or some of the processes illustrated in FIG. 8 and/or FIG. 13.

Moreover, an embodiment implemented by arbitrarily combining elements and/or functions exemplified in the above embodiments and variations falls within the scope of the present disclosure.

Note that each general and specific aspect of the present disclosure includes one or a combination of, for example, a device, system, method, integrated circuit, computer program, and computer-readable recording medium.

Hereinafter, configurations, variations, advantageous effects, etc., of the lighting control device, lighting control system, and control program according to one aspect of the present disclosure will be described.

(1) lighting control device 100, 100a according to one aspect of the present disclosure controls luminaires 30a through 30l via controllers 200a through 200c that control luminaires 30a through 30l in accordance with control information (for example, dimming level information, schedule information, etc.), and includes: storage unit 110, 110a that stores association information 111 in which a plurality of names (e.g., room names) are respectively associated with a plurality of network identifiers (e.g., SSIDs) for a plurality of wireless networks used to transfer the control information; communication unit 180, 180a that connects to one of the plurality of wireless networks and transmits and receives information to and from a controller (any one of controllers 200a through 200c) included in the wireless network that the communication unit is connected to; display unit 130 that displays the plurality of names in association information 111 in a manner to be selectable; receiving unit 140 that receives an input from a user including a selection input of a name selected from the plurality of names displayed on display unit 130; and processing unit 190, 190a that, when receiving unit 140 receives the selection input of one of the plurality of names, executes a predetermined process relating to connection with one of the plurality of wireless networks using the network identifier (e.g., SSID) associated in association information 111 with the name specified by the selection input. This makes it possible to execute a predetermined process related to connection with a wireless network without the user having to remember a network identifier. In other words, burdens placed on a user associated with operating a lighting control device that controls luminaires via controllers on a plurality of wireless networks can be eased.

(2) For example, lighting control device 100, 100a may further include setting unit 120 that generates association information 111 to be stored in storage unit 110, 110a by obtaining the plurality of names input by the user. Setting unit 120 may obtain a first name (e.g., "room X") that is related to a first location (e.g., room X) and is input by the user in association with a first network identifier (e.g., the SSID of controller 200a) for a first wireless network among the plurality of wireless networks that includes a first controller (e.g., controller 200a) which controls a luminaire (e.g., luminaires 30a through 30d) located in the first location (e.g., room X), and a second name (e.g., "room Y") that is related to a second location (e.g., room Y) different from the first location and is input by the user in association with a second network identifier (e.g., the SSID of controller 200b) for a second wireless network among the plurality of wireless networks that includes a second controller (e.g., controller 200b) which controls a luminaire (e.g., luminaires 30e through 30h) located in the second location (e.g., room Y). Setting unit 120 may generate association information 111 by associating at least the first network identifier with the first name and the second network identifier with the second name. This makes it possible for the user to predefine easily comprehensible names for the locations. So long as the user defines an appropriate name once, thereafter, the user can, for example, precisely select a wireless network simply by recognizing that name.

(3) For example, communication unit 180 may receive, from the controller (e.g., controller 200a) included in the wireless network that communication unit 180 is connected to, state information indicating a state of the luminaire (e.g., luminaires 30a through 30d) controlled by the controller. Display unit 130 may further display lighting control screen 40 showing the state information received by communication unit 180. When communication unit 180 connects to the first wireless network and receives the state information from the first controller (e.g., controller 200a), display unit 130 displays lighting control screen 40 based on the state information from the first controller (e.g., controller 200a), and receiving unit 140 receives the selection input of the second name (e.g., "room Y") by the user, processing unit 190 may, as the predetermined process, cause communication unit 180 to switch connection from the first wireless network to the second wireless network using the second network identifier. This makes it possible for the user to promptly switch the wireless network that lighting control device 100 is connected to by selecting a name in a state in which lighting control screen 40 is being displayed. Accordingly, it is possible to reduce burdens placed on the user associated with controlling luminaires in a plurality of locations (e.g., room X and room Y in FIG. 1).

(4) For example, lighting control device 100 may further include: recording medium 150 for recording the control information; and saving unit 160 that, in accordance with a save input made by the user (e.g., pressing of data save button 46, save button 46d, etc.), record a control file including the control information onto recording medium 150. Processing unit 190 may, as the predetermined process, associate, with a control file recorded on recording medium 150, the network identifier associated in association information 111 with the name specified by the selection input received by receiving unit 140. Lighting control device 100 may further include loading unit 170 that, in accordance with a load input made by the user (e.g., pressing of data load button 45, load button 45d, etc.), load one control file recorded on recording medium 150. When one of the plurality of network identifiers is associated with the control file loaded by loading unit 170, communication unit 180 may connect to one of the plurality of wireless networks using the network identifier associated with the control file and transmit the control information included in the control file to the controller included in the wireless network that communication unit 180 is connected to. This makes it possible for the user to transmit information in the control file to the corresponding controller simply by making a required input for loading the control file, which reduces burdens placed on the user pertaining to operations.

Figure 5:
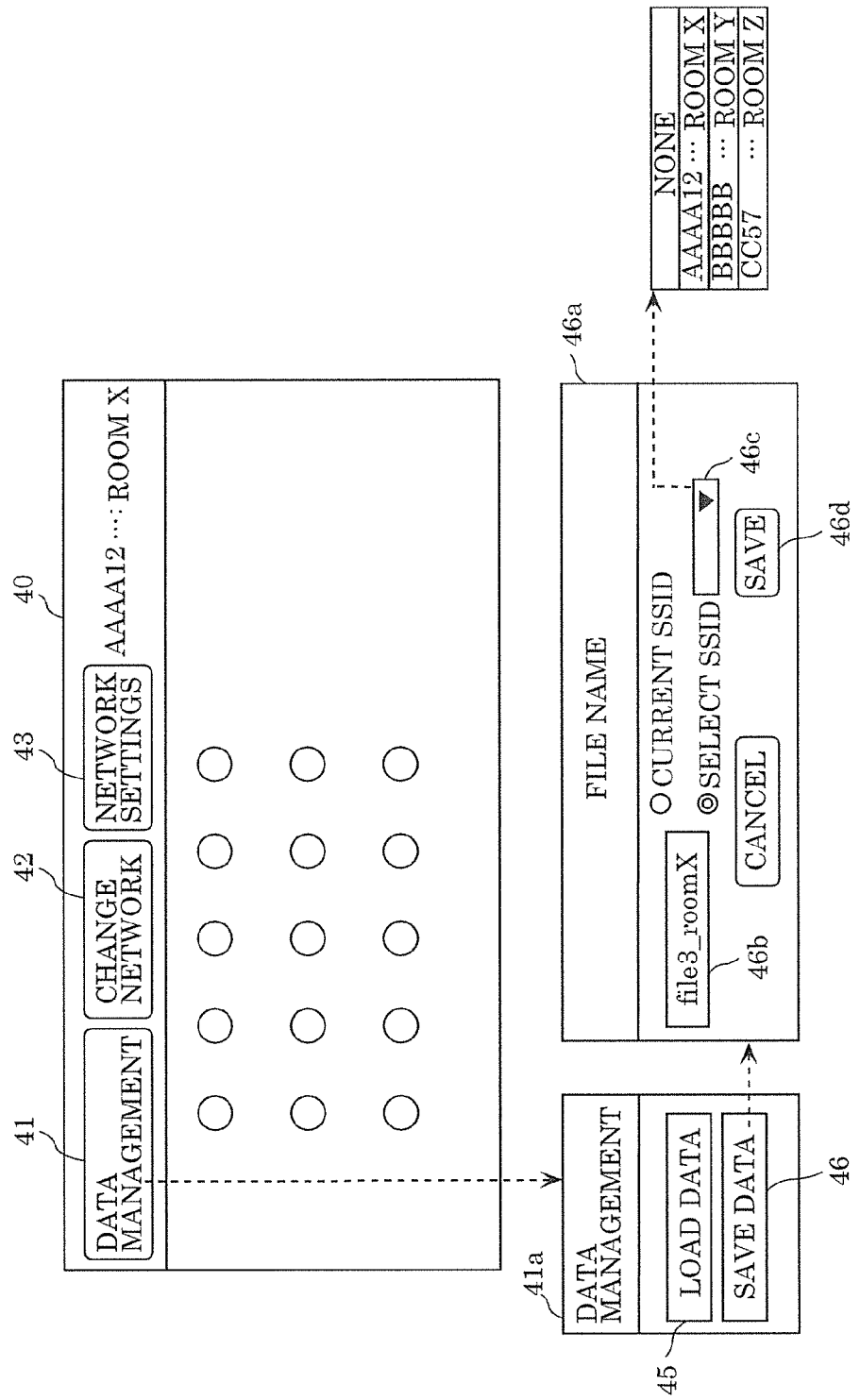
FIG. 5 illustrates one example of a screen pertaining to saving data displayed by a lighting control device.
Figure 6:
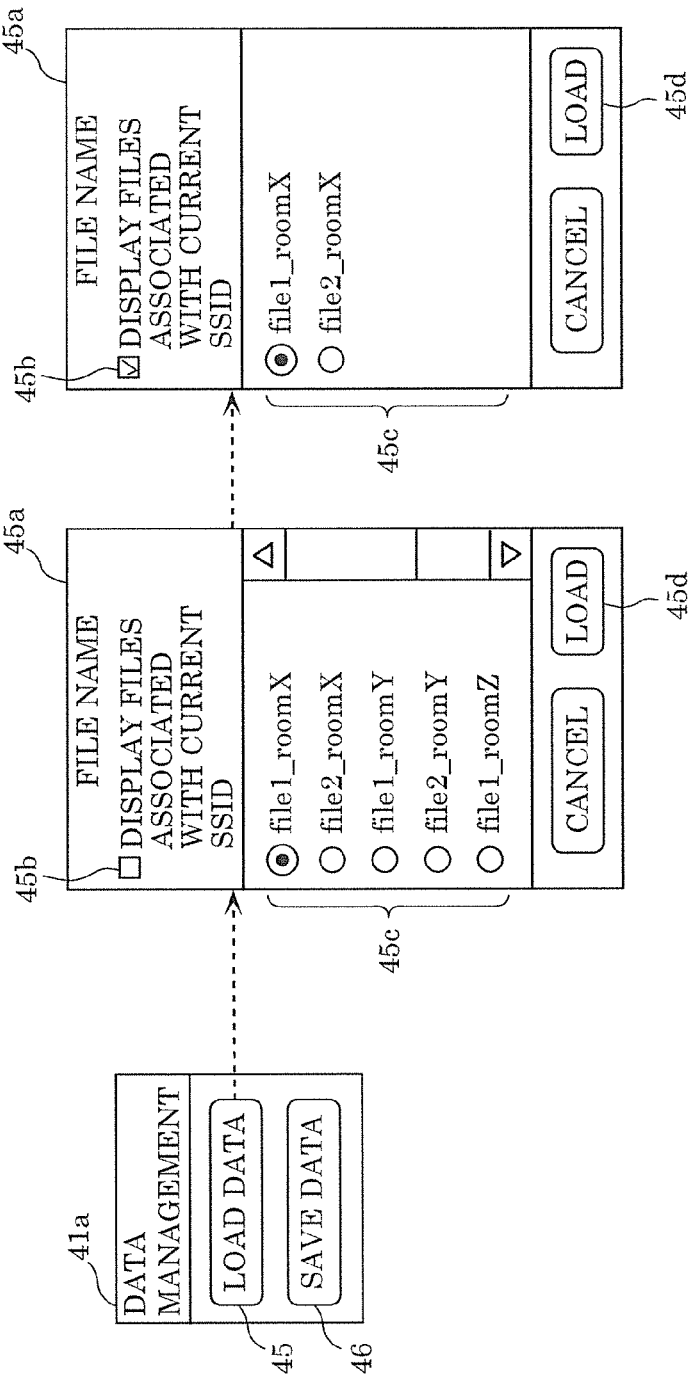
FIG. 6 illustrates one example of a screen pertaining to loading data displayed by a lighting control device.

(5) For example, when communication unit 180 is connected to one of the plurality of wireless networks, under a certain condition (e.g., when a radio button indicating the SSID currently connected to is selected from screen 46a illustrated in FIG. 5), saving unit 160 may, upon recording the control file onto recording medium 150, associate the control file with the network identifier for the wireless network that communication unit 180 is connected to. This makes it possible to reduce burdens placed on the user pertaining to operations for associating a control file with a network identifier.

(6) When, in accordance with a load input made by the user, loading unit 170 causes display unit 130 to display one or more control files recorded on recording medium 150 in a manner to be selectable (see FIG. 6), and receives a selection input of one control file from among the choices of the one or more control files by the user, loading unit 170 may load the one control file specified by the selection input. When communication unit 180 is connected to one of the plurality of wireless networks, under a certain condition (e.g., when check box 45b is checked), loading unit 170 may cause display unit 130 to display only the one or more control files associated with the network identifier for the wireless network that communication unit 180 is connected to. This makes it possible for the user to promptly select the desired control file.

(7) For example, lighting control device 100 may further include recording medium 150 for recording the control information; and saving unit 160 that, in accordance with a save input made by the user, records a control file including the control information onto recording medium 150. Upon recording the control file onto recording medium 150, saving unit 160 may associate the control file with one of the plurality of network identifiers included in association information 111. Lighting control device 100 may further include loading unit 170 that, in accordance with a load input made by the user, loads one control file recorded on recording medium 150. When one of the plurality of network identifiers is associated with the control file loaded by loading unit 170, communication unit 180 may connect to one of the plurality of wireless networks using the network identifier associated with the control file and transmit control information included in the control file to the controller included in the wireless network that communication unit 180 is connected to. This makes it possible for the user to transmit information in the control file to the corresponding controller simply by making a required input for loading the control file, which reduces burdens placed on the user pertaining to operations.

(8) For example, lighting control device 100*a* may execute a function of performing luminaire control only after user authentication is successful. After receiving unit 140 receives an input from a specified user having predetermined authorization to set, for each of users, authentication information used for authenticating the user (e.g., authorization to store authentication related information 112 in storage unit 110*a*), processing unit 190*a* may, as the predetermined process, store, in storage unit 110*a*, the authentication information in association with a network identifier associated in association information 111 with a name specified by a selection input made by the specified user and received by receiving unit 140. Lighting control device 100*a* may further include authentication unit 195 that authenticates a user by using the authentication information stored in storage unit 110*a*. When the user authentication is successful in authentication unit 195, communication unit 180*a* may connect to one of the plurality of wireless networks using the network identifier associated with the authentication information used for the user authentication. This makes it possible for the user to control a luminaire via lighting control device 100*a* without even having to perform a specific input for connecting to a wireless network, simply by performing an input for carrying out user authentication.

(9) For example, lighting control device 100*a* may execute a function of performing luminaire control only after user authentication is successful. Storage unit 110*a* may further store, for each of users, authentication information used for authentication of the user, in association with one of the plurality of network identifiers included in association information 111. Lighting control device 100*a* may further include authentication unit 195 that authenticates a user by using the authentication information stored in storage unit 110*a*. When the user authentication is successful in authentication unit 195, communication unit 180*a* may connect to one of the plurality of wireless networks using the network identifier associated with the authentication information used for the user authentication, and under a certain condition (e.g., in accordance with a user input), transmit the control information to the controller included in the wireless network that communication unit 180*a* is connected to. This makes it possible for the user to control, for example, a luminaire used by the user via lighting control device 100*a*, simply by performing an input for carrying out user authentication.

(10) Lighting control system 10 according to one aspect of the present disclosure that controls luminaires 30*a* through 30*l* includes: a first controller (controller 200*a*) that controls a luminaire (luminaires 30*a* through 30*d*) located in a first location; a second controller (controller 200*b*) that controls a luminaire (luminaires 30*e* through 30*h*) located in a second location different from the first location; and lighting control device 100, 100*a* that transmits control information to one of the first controller and the second controller to control the luminaire via the one of the first controller and the second controller.

Lighting control device 100, 100*a* includes: communication unit 180, 180*a* that connects to, and transmits the control information via, one of a first wireless network including the first controller and a second wireless network including the second controller; storage unit 110, 110*a* that stores association information 111 in which a first network identifier (e.g., the SSID for controller 200*a*) for the first wireless network is associated with a first name related to the first location and a second network identifier (e.g., the SSID for controller 200*b*) for the second wireless network is associated with a second name related to the second location; display unit 130 that displays the first name and the second name in association information 111 in a manner to be selectable; receiving unit 140 that receives an input from a user including a selection input of a name selected from the first name and the second name displayed on display unit 130; and processing unit 190, 190*a* that, when receiving unit 140 receives the selection input of the name, executes a predetermined process relating to connection with one of the plurality of wireless networks using the network identifier associated in the association information with the name specified by the selection input. Whereas network identifiers such as SSIDs are difficult to remember, so long as the user appropriately defines the first name and the second name so as to be easily recognizable, the user can relatively simply cause lighting control device 100 to execute a predetermined process related to connection with a wireless network by selecting the first name or the second name.

(11) A non-transitory computer-readable recording medium according to one aspect of the present disclosure has a control program (e.g., an application program for controlling lighting) recorded thereon for causing a lighting control device to execute a lighting control method. The lighting control device includes a storage unit (e.g., a storage medium such as memory) and a microprocessor and controls a plurality of luminaires via a plurality of controllers that control the plurality of luminaires in accordance with control information. The lighting control process includes: obtaining a first name (e.g., "room X") that is related to a first location (e.g., room X) and is input by a user in association with a first network identifier (e.g., the SSID for controller 200*a*) for a first wireless network among the plurality of wireless networks that includes a first controller (e.g., controller 200*a*) which controls a luminaire (luminaires 30*a* through 30*d*) located in the first location, and a second name (e.g., "room Y") that is related to a second location (e.g., room Y) different from the first location and is input by the user in association with a second network identifier (e.g., the SSID for controller 200*b*) for a second wireless network among the plurality of wireless networks that includes a second controller (e.g., controller 200b) which controls a luminaire (e.g., luminaires 30e through 30h) located in the second location (steps S11, S32); generating association information 111 in which the first network identifier is associated with the first name and the second network identifier is associated with the second name, and storing association information 111 in the storage unit (steps S12, S33); displaying the first name and the second name in association information 111 in a manner to be selectable (steps S14, S36); receiving an input from the user including a selection input of a name selected from the first name and the second name displayed (steps S15, S37); when the selection input of the name is received in the receiving, executing a predetermined process relating to connection with one of the plurality of wireless networks using the network identifier associated in association information 111 with the name specified by the selection input (steps S16, S38); and when connected to one of the plurality of wireless networks, transmitting the control information to the controller included in the wireless network connected to (steps S18, S44). Installing this program onto a computer and executing the program using the computer makes it possible to reduce burdens placed on a user that wishes to control luminaires via controllers on a plurality of wireless networks.

What is claimed is:

1. A lighting control device that controls one or more luminaires via one or more controllers that control the one or more luminaires in accordance with control information, the lighting control device comprising:
   a storage unit configured to store association information in which a plurality of names are respectively associated with a plurality of network identifiers for a plurality of wireless networks used to transfer the control information;
   a communication unit configured to connect to one of the plurality of wireless networks and transmit and receive information to and from a controller included in the wireless network that the communication unit is connected to;
   a display unit configured to display the plurality of names in the association information in a manner to be selectable;
   a receiving unit configured to receive an input from a user including a selection input of a name selected from the plurality of names displayed on the display unit; and
   a processing unit configured to, when the receiving unit receives the selection input of the name, execute a predetermined process relating to connection with one of the plurality of wireless networks using the network identifier associated in the association information with the name specified by the selection input.

2. The lighting control device according to claim 1, further comprising:
   a setting unit configured to generate the association information to be stored in the storage unit by obtaining the plurality of names input by the user,
   wherein the setting unit is configured to:
      obtain a first name that is related to a first location and is input by the user in association with a first network identifier for a first wireless network among the plurality of wireless networks that includes a first controller which controls a luminaire located in the first location, and a second name that is related to a second location different from the first location and is input by the user in association with a second network identifier for a second wireless network among the plurality of wireless networks that includes a second controller which controls a luminaire located in the second location; and
      generate the association information by associating at least the first network identifier with the first name and the second network identifier with the second name.

3. The lighting control device according to claim 2, wherein:
   the communication unit is configured to receive, from the controller included in the wireless network that the communication unit is connected to, state information indicating a state of the luminaire controlled by the controller,
   the display unit is further configured to display a lighting control screen showing the state information received by the communication unit, and
   when (i) the communication unit connects to the first wireless network and receives the state information from the first controller, (ii) the display unit displays the lighting control screen based on the state information from the first controller, and (iii) the receiving unit receives the selection input of the second name by the user, the processing unit is configured to, as the predetermined process, cause the communication unit to switch connection from the first wireless network to the second wireless network using the second network identifier.

4. The lighting control device according to claim 1, further comprising:
   a non-transitory recording medium for recording the control information; and
   a saving unit configured to, in accordance with a save input made by the user, record a control file including the control information onto the non-transitory recording medium,
   wherein the processing unit is configured to, as the predetermined process, associate, with the control file recorded on the non-transitory recording medium, the network identifier associated in the association information with the name specified by the selection input received by the receiving unit,
   the lighting control device further comprises a loading unit configured to, in accordance with a load input made by the user, load one control file recorded on the non-transitory recording medium, and
   when one of the plurality of network identifiers is associated with the control file loaded by the loading unit, the communication unit is configured to connect to one of the plurality of wireless networks using the network identifier associated with the control file and transmit the control information included in the control file to the controller included in the wireless network that the communication unit is connected to.

5. The lighting control device according to claim 4, wherein
   when the communication unit is connected to one of the plurality of wireless networks, under a certain condition, the saving unit is configured to, upon recording the control file onto the non-transitory recording medium, associate the control file with the network identifier for the wireless network that the communication unit is connected to.

6. The lighting control device according to claim 5, wherein
   the certain condition is a condition that is satisfied by receipt of an input from the user.

7. The lighting control device according to claim 4, wherein:
when, in accordance with a load input made by the user, the loading unit causes the display unit to display one or more control files recorded on the non-transitory recording medium in a manner to be selectable, and receives a selection input of a control file selected from the one or more control files by the user, the loading unit is configured to load the one control file specified by the selection input, and
when the communication unit is connected to one of the plurality of wireless networks, under a certain condition, the loading unit is configured to cause the display unit to display only one or more control files associated with the network identifier for the wireless network that the communication unit is connected to.

8. The lighting control device according to claim 7, wherein
the certain condition is a condition that is satisfied by receipt of an input from the user.

9. The lighting control device according to claim 1, further comprising:
a non-transitory recording medium for recording the control information; and
a saving unit configured to, in accordance with a save input made by the user, record a control file including the control information onto the non-transitory recording medium,
wherein upon recording the control file onto the non-transitory recording medium, the saving unit is configured to associate the control file with one of the plurality of network identifiers included in the association information,
the lighting control device further comprises a loading unit configured to, in accordance with a load input made by the user, load one control file recorded on the non-transitory recording medium, and
when one of the plurality of network identifiers is associated with the control file loaded by the loading unit, the communication unit is configured to connect to one of the plurality of wireless networks using the network identifier associated with the control file and transmit the control information included in the control file to the controller included in the wireless network that the communication unit is connected to.

10. The lighting control device according to claim 1, wherein:
the lighting control device executes a function of performing luminaire control only after user authentication is successful,
after the receiving unit receives an input from a specified user having predetermined authorization to set, for each of users, authentication information used for authenticating the user, the processing unit is configured to, as the predetermined process, store, in the storage unit, the authentication information in association with a network identifier associated in the association information with a name specified by a selection input made by the specified user and received by the receiving unit,
the lighting control device further includes an authentication unit configured to authenticate a user by using the authentication information stored in the storage unit, and
when the user authentication is successful in the authentication unit, the communication unit is configured to connect to one of the plurality of wireless networks using the network identifier associated with the authentication information used for the user authentication.

11. The lighting control device according to claim 1, wherein:
the lighting control device executes a function of performing luminaire control only after user authentication is successful,
the storage unit is further configured to store, for each of users, authentication information used for authentication of the user, in association with one of the plurality of network identifiers included in the association information, and
the lighting control device further includes an authentication unit configured to authenticate a user by using the authentication information stored in the storage unit,
wherein when the user authentication is successful in the authentication unit, the communication unit is configured to connect to one of the plurality of wireless networks using the network identifier associated with the authentication information used for the user authentication, and under a certain condition, transmit the control information to the controller included in the wireless network that the communication unit is connected to.

12. The lighting control device according to claim 11, wherein
the certain condition is a condition that is satisfied by receipt of an input from the user.

13. A lighting control system that controls a plurality of luminaires, the lighting control system comprising:
a first controller that controls a luminaire located in a first location;
a second controller that controls a luminaire located in a second location different from the first location; and
a lighting control device that transmits control information to one of the first controller and the second controller to control the luminaire via the one of the first controller and the second controller,
wherein the lighting control device includes:
a communication unit configured to connect to, and transmit the control information via, one of a first wireless network including the first controller and a second wireless network including the second controller;
a storage unit configured to store association information in which a first network identifier for the first wireless network is associated with a first name related to the first location and a second network identifier for the second wireless network is associated with a second name related to the second location;
a display unit configured to display the first name and the second name in the association information in a manner to be selectable;
a receiving unit configured to receive an input from a user including a selection input of a name selected from the first name and the second name displayed on the display unit; and
a processing unit configured to, when the receiving unit receives the selection input of the name, execute a predetermined process relating to connection with one of the plurality of wireless networks using the network identifier associated in the association information with the name specified by the selection input.

14. A lighting control method executed by a lighting control device that includes a storage unit and a microprocessor and controls a plurality of luminaires via a plurality of controllers that control the plurality of luminaires in accordance with control information, the lighting control method comprising:

obtaining a first name that is related to a first location and is input by a user in association with a first network identifier for a first wireless network among the plurality of wireless networks that includes a first controller which controls a luminaire located in the first location, and a second name that is related to a second location different from the first location and is input by the user in association with a second network identifier for a second wireless network among the plurality of wireless networks that includes a second controller which controls a luminaire located in the second location;

generating association information in which the first network identifier is associated with the first name and the second network identifier is associated with the second name, and storing the association information in the storage unit;

displaying the first name and the second name in the association information in a manner to be selectable;

receiving an input from the user including a selection input of a name selected from the first name and the second name displayed;

when the selection input of the name is received in the receiving, executing a predetermined process relating to connection with one of the plurality of wireless networks using the network identifier associated in the association information with the name specified by the selection input; and when connected to one of the plurality of wireless networks, transmitting the control information to the controller included in the wireless network connected to.

15. A non-transitory computer-readable recording medium having a control program recorded thereon for causing the lighting control device to execute the lighting control method according to claim 14.

* * * * *